(12) United States Patent
Fukushima

(10) Patent No.: US 9,560,245 B2
(45) Date of Patent: Jan. 31, 2017

(54) IMAGING APPARATUS AND CONTROL METHOD THEREOF

(71) Applicant: CANON KABUSHIKI KAISHA, Tokyo (JP)

(72) Inventor: Yuki Fukushima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/799,408

(22) Filed: Jul. 14, 2015

(65) Prior Publication Data

US 2016/0028938 A1    Jan. 28, 2016

(30) Foreign Application Priority Data

Jul. 22, 2014    (JP) .................................. 2014-148789

(51) Int. Cl.
| | |
|---|---|
| H04N 5/225 | (2006.01) |
| H04N 5/232 | (2006.01) |
| G03B 13/36 | (2006.01) |
| G03B 7/00 | (2014.01) |

(52) U.S. Cl.
CPC .......... *H04N 5/2251* (2013.01); *H04N 5/2254* (2013.01); *H04N 5/23212* (2013.01); *H04N 5/23219* (2013.01); *H04N 5/23245* (2013.01); *H04N 5/23248* (2013.01); *G03B 7/00* (2013.01); *G03B 13/36* (2013.01); *G03B 2217/002* (2013.01)

(58) Field of Classification Search
CPC   H04N 5/2251; H04N 5/2252; H04N 5/23245; H04N 5/00; G03B 2217/002
See application file for complete search history.

(56) References Cited

U.S. PATENT DOCUMENTS 5,630,185 A * 5/1997 Kawamura ............ G03B 17/18
                                                          348/E5.042

FOREIGN PATENT DOCUMENTS

JP           2004-271570 A           9/2004

* cited by examiner

*Primary Examiner* — Paul Berardesca
(74) *Attorney, Agent, or Firm* — Canon USA, Inc. IP Division

(57) ABSTRACT

An imaging apparatus having a lens or a mount unit for mounting a lens on an object side surface of an apparatus main body and a grip unit at an end portion on one side of the apparatus main body, includes a setting unit to set a prohibit state that prohibits changing a setting value, an operation member for changing the setting value, a temporary cancel member, and a control unit to perform control. Where the prohibit state is set and if the temporary cancel member has not been operated and the operation member has been operated, the control unit controls not to change the setting value. Where the prohibit state is set and if the temporary cancel member has been operated and the operation member has been operated, the control unit changes the setting value according to an operation performed on the operation member.

25 Claims, 5 Drawing Sheets

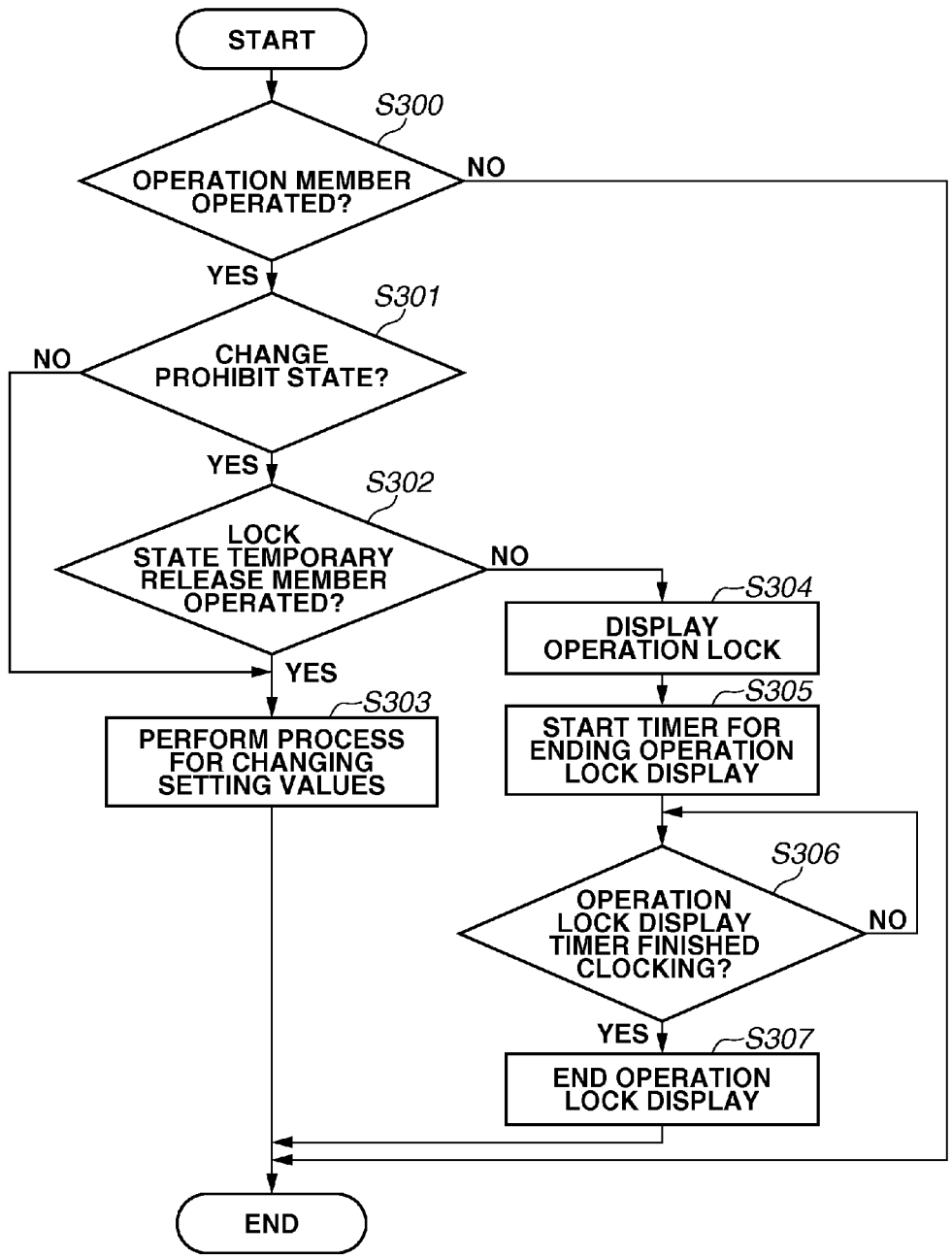

IMAGING APPARATUS AND CONTROL METHOD THEREOF

BACKGROUND OF THE INVENTION

Field of the Invention

The present invention relates to an imaging apparatus capable of setting a setting value of a specific setting item to a change prohibit state and a control method thereof.

Description of the Related Art

There is a demand for locking various parameters related to exposure and auto focus (AF) to prevent the parameters from being unintentionally changed. For example, there is a product model which causes a lock member to enter a change prohibit state and thus locks the parameters (e.g., a hold function of mobile phones). In such a product model, users can switch between a lock and unlock state with a single operation and can easily operate the imaging apparatus.

Japanese Patent Application Laid-Open No. 2004-271570 discusses an imaging apparatus having an operation mode which only receives an operation input from a predetermined operation switch including a release switch. Such a configuration is effective in preventing erroneous operation.

As described above, there are various techniques for locking functions. However, if a camera is normally in the lock state and a user desires to temporarily cancel the lock state, the user is required to once remove the user's hand from a grip unless the user can carry out the cancel operation while holding the camera. The user may feel that operability is poor. Further, in such a camera, it is difficult to promptly switch between the lock and the unlock state.

Furthermore, when capturing still images, the user may hold the camera in a vertical position and capture an image, so that it is desirable to obtain similar operability in the vertical position.

SUMMARY OF THE INVENTION

The present invention is directed to an operation system capable of speedily switching between the lock and unlock state with little erroneous operation.

According to an aspect of the present invention, an imaging apparatus, having a lens or a mount unit for mounting a lens on an object side surface of an apparatus main body and a grip unit at an end portion on one side of the apparatus main body, includes a setting unit configured to set a prohibit state that prohibits changing a setting value of a specific setting item, an operation member to be used in changing the setting value of the specific setting item, a temporary cancel member, and a control unit configured to perform control, in a case where the prohibit state is set and if the temporary cancel member has not been operated and the operation member has been operated, not to change the setting value of the specific setting item, and in a case where the prohibit state is set and if the temporary cancel member has been operated and the operation member has been operated, to change the setting value of the specific setting item according to an operation performed on the operation member.

Further features of the present invention will become apparent from the following description of exemplary embodiments with reference to the attached drawings.

BRIEF DESCRIPTION OF THE DRAWINGS

FIG. 3 is a flowchart illustrating a setting change process when the imaging apparatus is in a photographing standby state.

DESCRIPTION OF THE EMBODIMENTS

The exemplary embodiments of the present invention will be described below with reference to the accompanied drawings.

Figure 1:
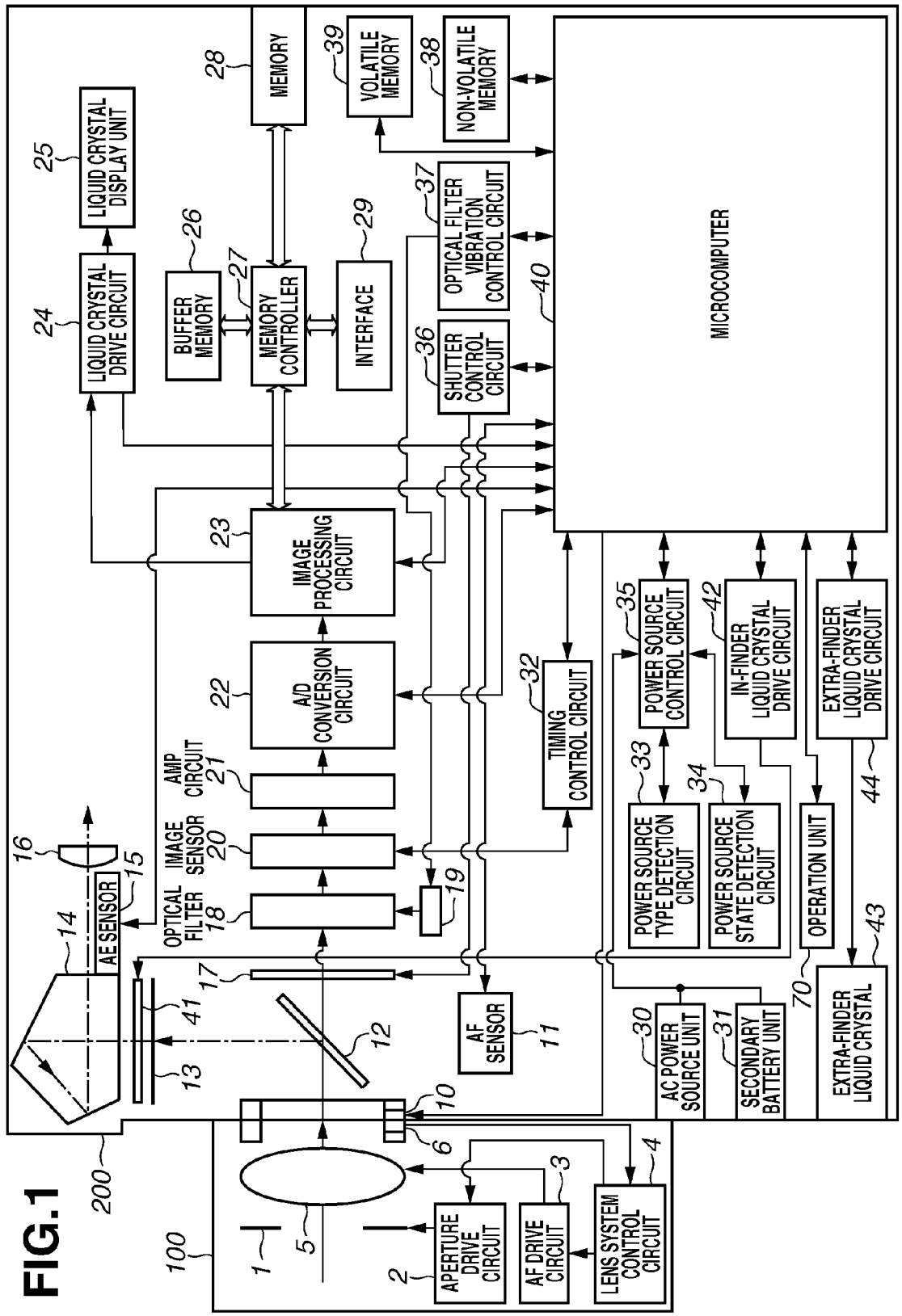
FIG. 1 is a block diagram illustrating a configuration of an imaging apparatus according to an exemplary embodiment of the present invention.

FIG. 1 is a block diagram illustrating the configuration of an imaging apparatus according to an exemplary embodiment of the present invention.

Referring to FIG. 1, an interchangeable lens unit 100 is attached to an imaging apparatus main body (hereinafter referred to as the apparatus main body) 200.

A lens 5 in the lens unit 100 is normally configured of a plurality of lenses. In the present embodiment, the lens 5 is represented by one lens for simplification. A communication terminal 6 is used for the lens unit 100 to communicate with the apparatus main body 200, and a communication terminal 10 is used for the apparatus main body 200 to communicate with the lens unit 100. More specifically, the lens unit 100 communicates with a microcomputer 40 in the apparatus main body 200 via the communication terminals 6 and 10 and controls an aperture 1 via an aperture drive circuit 2 using an internal lens system control circuit 4. The lens unit 100 then changes the position of the lens 5 via an AF drive circuit 3 and thus performs focusing. Further, the microcomputer 40 in the apparatus main body 200 obtains a maximum aperture value and a minimum aperture value of the lens unit 100 via the communication terminals 6 and 10.

An auto-exposure (AE) sensor 15 in the apparatus main body 200 measures luminance of an object through the lens unit 100.

An AF sensor 11 outputs defocus amount information to the microcomputer 40. The microcomputer 40 then controls the lens unit 100 based on the received information.

When performing exposure, a quick return mirror 12 is moved up and down by an actuator (not illustrated) according to an instruction from the microcomputer 40. A photographer views a focusing screen 13 via a pentagonal prism 14 and a finder 16 to confirm a focus point of an optical image of the object and a composition obtained through the lens unit 100.

A focal plane shutter 17 can freely control an exposure time of an image sensor 20 based on control of the microcomputer 40.

An optical filter 18 is generally formed of a low pass filter or the like. The optical filter 18 blocks a high frequency component of light entering from the focal plane shutter 17 and guides the light of the object image to the image sensor 20.

The image sensor 20 is generally a charge-coupled device (CCD) image sensor or a complementary metal oxide semiconductor (CMOS) image sensor. The image sensor 20 performs photoelectric conversion of the object image formed thereon via the lens unit 100 and obtains the image as an electric signal.
}

An amplifying (AMP) circuit 21 amplifies the obtained electric signal, i.e., a photographing signal, with a gain according to set photographic sensitivity.

An analog to digital (A/D) conversion circuit 22 converts an analog signal converted to the electric signal by the image sensor 20 to a digital signal.

An image processing circuit 23 performs filtering, color conversion, and gamma/knee processing on image data converted to the digital signal by the A/D conversion unit 22 and outputs the processed image data to a memory controller 27. Further, the image processing circuit 23 includes therein a digital to analog (D/A) conversion circuit. Furthermore, the image processing circuit 23 can converts the image data converted to the digital signal by the A/D conversion unit 22 or the image data input from the memory controller 27 to the analog signal and output the converted signal to a liquid crystal display unit 25 via a liquid crystal drive circuit 24. The microcomputer 40 switches between the above-described image processing and display processing performed by the image processing circuit 23. Further, the microcomputer 40 adjusts white balance based on color balance information of the captured image.

The liquid crystal display unit 25 is a back surface monitor for displaying the image. The back surface monitor is not limited to a display employing a liquid crystal method and may be a display device employing other methods such as an organic electroluminescence (EL) display device as long as the image is displayed. The memory controller 27 stores unprocessed image data input from the image processing circuit 23 in a buffer memory 26 or stores processed image data in a recording medium 28. Further, the memory controller 27 reads image data from the buffer memory 26 or the recording medium 28 and outputs the image data to the image processing circuit 23. Furthermore, the memory controller 27 can store image data received via an external interface 29 in the recording medium 28 and output the image data stored in the recording medium 28 to outside via the external interface 29. Examples of the external interface are a universal serial bus (USB), Institute of Electrical and Electronics Engineers (IEEE) interface, and high-definition multimedia interface (HDMI, registered trademark).

The recording medium 28 is a detachable storage medium such as a memory card, or may be an internal memory. The microcomputer 40 controls drive timing of the image sensor 20 via a timing control circuit 32.

A power control circuit 35 controls the power supplied from an alternating current (AC) power source unit 30 or a secondary battery 31. Further, the power control circuit 35 receives the instruction from the microcomputer 40 and switches the power on and off. Furthermore, the power control circuit 35 notifies the microcomputer 40 of the information about the current power source state detected by a power source state detection circuit 34 and the information about the type of the current power source detected by a power source type detection circuit 33.

A shutter control circuit 36 controls the focal plane shutter 17 under control of the microcomputer 40.

An optical filter vibration control circuit 37 vibrates a piezoelectric element 19 connected to an optical filter 18. The optical filter vibration control circuit 37 vibrates the piezoelectric element 19, according to the instruction from the microcomputer 40, such that vibrations are generated with predetermined values with respect to amplitude, time, and an axial direction of the vibration.

A non-volatile memory 38, i.e., a non-volatile storage medium, can retain the setting values of shutter speed, the aperture value, the photographing sensitivity arbitrarily set by the photographer, and other various data even when the power of the image apparatus is switched off.

A volatile memory 39 stores the data to be temporarily stored, such as an internal state of the imaging apparatus and the information about the detachable recording medium 28.

An intra-finder display unit 41 displays via an intra-finder liquid crystal drive circuit 42 a frame indicating range-finding points at which auto-focusing is currently being performed, and icons indicating a setting status of a camera.

A extra-finder liquid crystal 43 displays various setting values of the camera such as the shutter speed and the aperture via an extra-finder liquid crystal drive circuit 44.

An operation unit 70 is configured of various operation members as input units for receiving the operations from the photographer. The examples of the operation members included in the operation unit 70 are a release button 201, a main electronic dial 202, an electronic sub-dial 203, a power switch 204, a protect button 205, a menu button 206, a delete button 207, an enlargement mode button 208, a reproduction instruction button 209, a single/multi-point switching button 210, a multi-controller 211, a determination button 212, a multi-electronic lock switch 213, and a lock state temporary cancel member 214 (release member) illustrated in FIGS. 2A, 2B, and 2C.

The microcomputer 40 controls each of the units included in the imaging apparatus. The microcomputer 40 expands the programs stored in the non-volatile memory 38 on the volatile memory 39, i.e., a work memory, to execute the programs, and thus realizes the various processes to be described below.

Figure 2A:
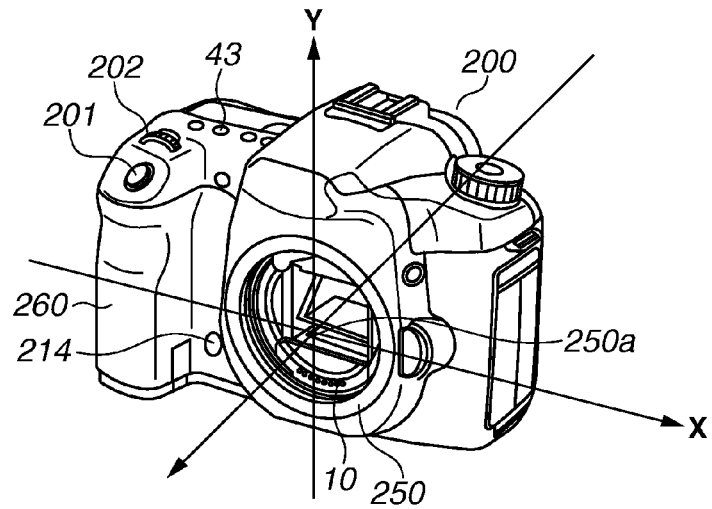
FIGS. 2A, 2B, and 2C each illustrate an outer appearance shape of the main body of the imaging apparatus according to the exemplary embodiment.
Figure 2B:
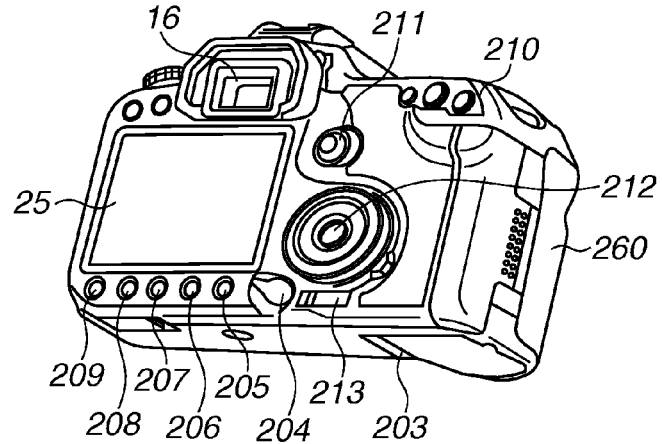
Figure 2C:
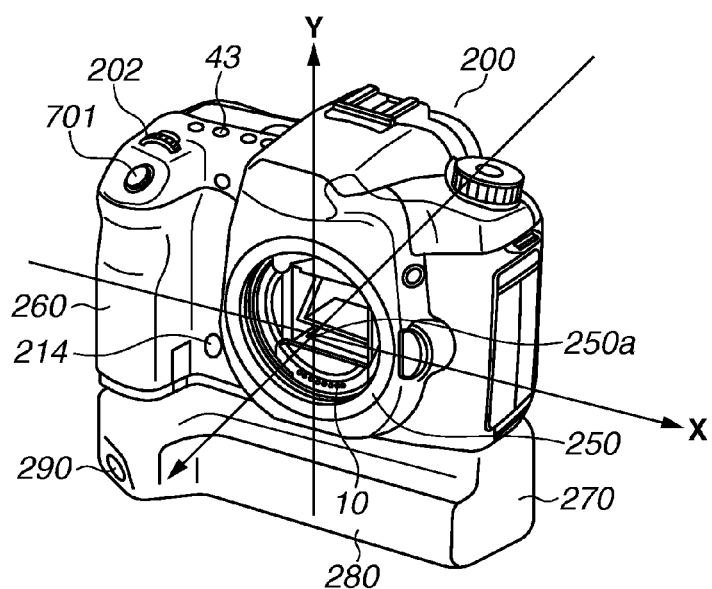

FIGS. 2A, 2B, and 2C each illustrate the outer appearance shape of the apparatus main body 200 of the imaging apparatus according to the present exemplary embodiment. Referring to FIGS. 2A, 2B, and 2C, the imaging apparatus includes a mount unit 250 for attaching the lens unit 100 on a front surface (i.e., the object side surface) of the apparatus main body 200 and a grip unit 260 at the end portion on one side of the apparatus main body 200. In the description below, relative directions, such as up, down, left or right, will be indicated based on the state in which the grip unit 260 is positioned at the end portion on the right side of the apparatus main body 200 as seen from the photographer side for ease of description. In other words, as illustrated in FIG. 2A, the direction in which a line X extends running through a mount center portion 250a will be described as the left and right directions (as seen from the photographer). Further, the direction in which a line Y extends running through the mount center portion 250a will be described as the vertical directions.

FIG. 2A illustrates the outer appearance shape as viewed diagonally from a front side of the apparatus main body 200. FIG. 2B illustrates the outer appearance shape as viewed from the back surface (i.e., an opposite side of the object side surface) of the apparatus main body 200. The portions corresponding to those illustrated in FIG. 1 are indicated using the same reference numerals.

The mount unit 250 is used for mounting the lens unit 100. The mount center portion 250a is the center position of the circular mount unit 250.

The grip unit 260 is a grip used by the photographer for holding the imaging apparatus.

The release button 201 is an operation member for inputting a photographing preparation instruction and a photographing instruction. If the photographer half-presses the release button 201, the imaging apparatus measures the luminance of the object and performs focusing. If the photographer fully-presses the release button 201, the shutter is released and the image is captured. The release button 201 is arranged on an upper portion of the grip unit 260 as illustrated in FIG. 2A.

The main electronic dial 202 is a rotationally operating member. The photographer dials the main electronic dial 202 to set the shutter speed and the aperture value, and performs minute adjustment of an enlargement magnification in the enlargement mode. As illustrated in FIG. 2A, the main electronic dial 202 is arranged on the grip unit 260 side relative to the mount center portion 250a and on the upper surface. As a result, the main electronic dial 202 is operable at the same time as the lock state temporary cancel member 214, which will be described in detail below.

The electronic sub-dial 203 is a rotationally operating member. The photographer dials the electronic sub-dial 203 to set the setting values of the aperture and exposure correction, and to advance a single image in an image display state. As illustrated in FIG. 2B, the electronic sub-dial 203 is arranged closer to the grip unit 260 side than the mount center portion 250a and on the back surface. The electronic sub-dial 203 is thus operable at the same time as the lock state temporary cancel member 214.

The power switch 204 is an operation member for switching the imaging apparatus between the power on state and off state. The protect button 205 is an operation member for, for example, protecting or rating on the images stored in the recording medium in and outside of the imaging apparatus. The menu button 206 is an operation member for displaying various setting screens on the liquid crystal display unit 25. The delete button 207 is an operation member for inputting an instruction to delete the images stored in the recording medium in and outside of the imaging apparatus. The enlargement mode button 208 is the operation member for receiving an instruction to shift a mode into the enlargement mode (i.e., an enlargement mode start instruction) or to exit from the enlargement mode (i.e., an enlargement mode end instruction). The reproduction instruction button 209 is an operation member for displaying the images stored in the recording medium in and outside of the imaging apparatus on the liquid crystal display unit 25. The above described operation members, i.e., the power switch 204, the protect button 205, the menu button 206, the delete button 207, the enlargement mode button 208, and the reproduction instruction button 209, are horizontally arranged on the back surface below the liquid crystal display unit 25.

The single/multi-point switching button 210 is an operation member for shifting a mode into the mode for selecting the range-finding points, i.e., points for starting auto-focusing. The single/multi-point switching button 210 is arranged on an upper-right portion of the back surface.

The multi-controller 211 is an operation member operable in a plurality of directions for setting the range-finding points, i.e., the AF start points, or moving an enlargement frame (i.e., an enlarged range) in an enlarged image display state. As illustrated in FIG. 2B, the multi-controller 211 is arranged, on the back surface, closer to the grip unit 260 side than the mount center portion 250a, and is thus operable at the same time as the lock state temporary cancel member 214.

The determination button 212 is an operation member with which the photographer inputs a selected item in a state where the various setting screens are being displayed on the liquid crystal display unit 25 after the photographer has pressed the menu button 206. Further, when the setting screen is not displayed, the lock state is temporarily cancelled (released) while the photographer is pressing the determination button 212. The determination button 212 is arranged at the center of the electronic sub-dial 203.

As described above, the operation members are arranged so that, while the photographer is holding the grip unit 260 with the right hand, the photographer can operate the release button 201 and the main electronic dial 202 with the right index finger of the hand holding the grip unit 260. Further, the photographer can operate the electronic sub-dial 203, the single/multi-point switching button 210, the multi-controller 211, and the determination button 212 with a thumb of the right hand holding the grip unit 260.

The multi-electronic lock switch 213 is the operation member for prohibiting change of the setting value (i.e., set change of the setting value to the prohibit state) even if the photographer operates the main electronic dial 202, the electronic sub-dial 203, or the multi-controller 211. When the multi-electronic lock switch 213 is maintained in a "lock" position, the lock state is assumed, and when the multi-electronic lock switch 213 is changed to an "unlock" position, the lock state is cancelled. The multi-electronic lock switch 213 is arranged below the electronic sub-dial 203.

The lock state temporary cancel member 214 is an operation member for temporarily releasing the lock state while it is operated even when the multi-electronic lock switch 213 is in the "lock" position. As illustrated in FIG. 2A, the lock state temporary cancel member 214 is arranged closer to the grip unit 260 side than the mount center portion 250a and on the front surface. As a result, the photographer can operate the lock state temporary cancel member 214 while holding the grip unit 260. Further, the lock state temporary cancel member 214 is operable at the same time as the operation member group for changing the setting values, such as the main electronic dial 202, the electronic sub-dial 203, and the multi-controller 211, which are arranged on the grip unit 260 side relative to the mount center portion 250a and on the upper surface or the back surface.

The lock state temporary cancel member 214 is a push or lever type operation member which returns to an original position when it is not operated. The imaging apparatus can thus immediately return to the lock state when the operation ends, and the imaging apparatus can be speedily switched between the lock state and the unlock state.

FIG. 2C illustrates the outer appearance shape of the apparatus main body 200 to which a grip accessory 270 for holding the imaging apparatus in the vertical position is attached, as viewed from the diagonal front side.

Referring to FIG. 2C, the grip accessory 270 for holding the imaging apparatus in the vertical position is a grip detachably attached to a lower surface of the apparatus main body 200. If the grip accessory 270 is attached and the imaging apparatus is vertically held with the grip unit 260 at the upper side, the photographer can hold the imaging apparatus with the right hand. When the photographer holds a grip unit 280 of the grip accessory 270 with the right hand, a release button 290 formed on the grip accessory 270 can be operated with the index finger of the right hand holding the grip unit 280.

Further, as illustrated in FIG. 2A, the lock state temporary cancel member 214 is arranged in the periphery of the mount unit 250 and below the line X (in a position lower than the line X), i.e., in a lower portion of the imaging apparatus. As a result, when the grip accessory 270 for holding the imaging apparatus in the vertical position is attached, the photographer can operate the lock state temporary cancel member 214 even when the photographer is holding the imaging apparatus in a normal position or the vertical position. In other words, the lock state temporary cancel member 214 is arranged at the position where the photographer can operate the lock state temporary cancel member 214 using the index finger or the ring finger of the right hand which is holding the imaging apparatus when the photographer is holding the grip unit 260 or the grip unit 280 with the right hand.

The imaging apparatus including an interchangeable lens has been described above as an example. Alternatively, if an imaging apparatus including a fixed-lens is used, the mount center portion 250a is replaced by a lens center portion.

The process performed by the imaging apparatus for changing the settings in the lock state will be described below with reference to FIGS. 3, 4A, 4B, 5A, and 5B.

FIG. 3 is a flowchart illustrating a setting change process performed when the imaging apparatus is switched on and is in a photographing standby state. The process is realized by the microcomputer 40 reading out the program stored in the non-volatile memory 38 into the volatile memory 39 and executing the program. When the imaging apparatus is in the photographing standby state and the release button 201 is pressed, the still image is photographed (not illustrated in the flowchart).

An example according to the present embodiment will be described below where the shutter speed is a setting item and the main electronic dial 202 is an operation member for changing the setting value of the shutter speed.

In step S300, the microcomputer 40 determines whether the main electronic dial 202, i.e., an operation member for changing the shutter speed, has been operated. If the main electronic dial 202 has been operated (YES in step S300), the process proceeds to step S301. If the main electronic dial 202 has not been operated (NO in step S300), the process ends. If the shutter speed can be changed using the electronic sub-dial 203 in addition to the main electronic dial 202, the microcomputer 40 determines whether the main electronic dial 202 or the electronic sub-dial 203 has been operated.

In step S301, the microcomputer 40 determines whether the multi-electronic lock switch 213 is maintained in the "lock" position. If the multi-electronic lock switch 213 is maintained in the "lock" position (YES in step S301), the process proceeds to step S302. If the multi-electronic lock switch 213 is not maintained in the "lock" position (NO in step S301), the process proceeds to step S303.

In step S302, the microcomputer 40 determines whether the lock state temporary cancel member 214 has been operated. If the lock state temporary cancel member 214 has been operated (YES in step S302), the process proceeds to step S303. If the lock state temporary cancel member 214 has not been operated (NO in step S302), the process proceeds to step S304.

In step S303, the microcomputer 40 changes the shutter speed to a higher speed or a lower speed.

In step S304, the microcomputer 40 displays operation lock information indicating that the operation of the apparatus is currently locked. More specifically, the microcomputer 40 updates the information displayed on the intra-finder display unit 41 via the intra-finder liquid crystal drive circuit 42 and updates the information displayed on the extra-finder liquid crystal 43 via the extra-finder liquid crystal drive circuit 44.

Figure 4A:
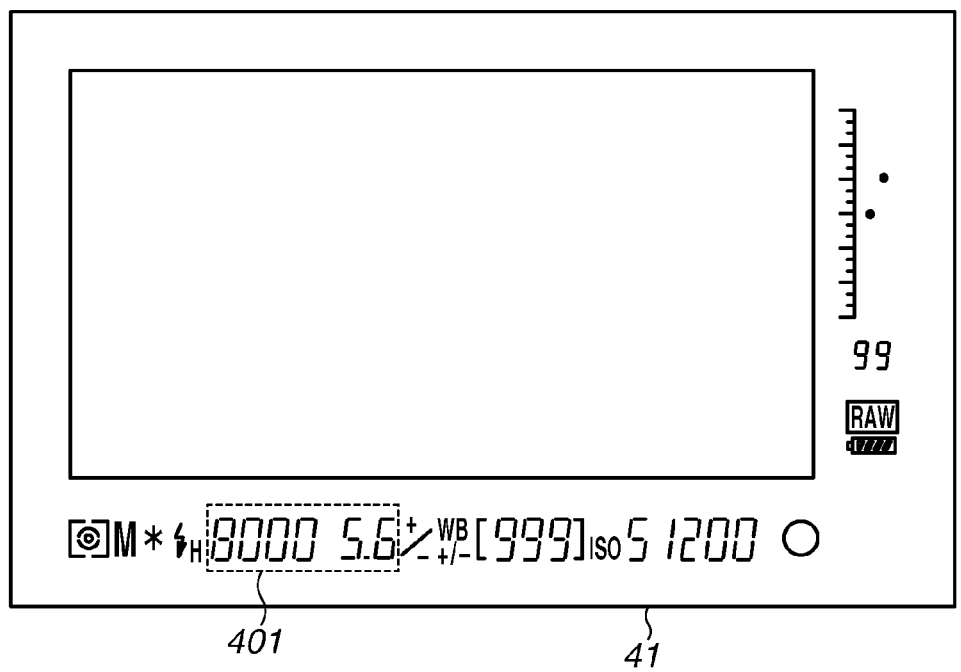
FIGS. 4A and 4B each illustrate a display example of an intra-finder display unit.
Figure 4B:
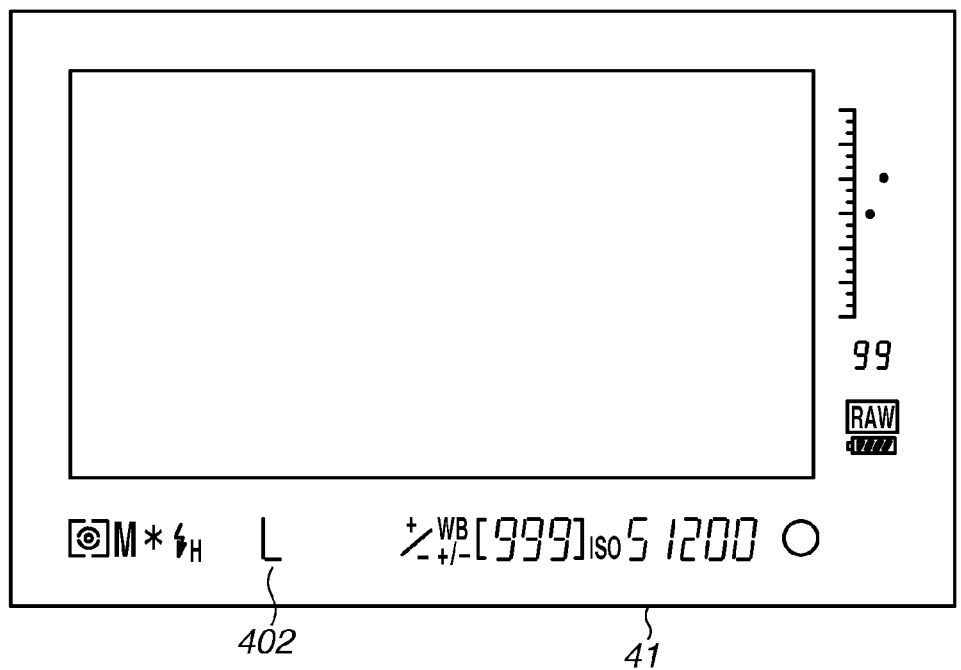

FIG. 4A illustrates an example of a regular display on the intra-finder display unit 41. FIG. 4B illustrates an example of the display on the intra-finder display unit 41 when the operation lock information is displayed. Referring to FIG. 4A, setting values 401 indicate the currently set shutter speed and aperture value. When the operation lock information is displayed, the display of the setting values 401 is replaced by "L" 402 which is an initial letter of "Lock" as illustrated in FIG. 4B. Thus, the display of the shutter speed is switched to the display indicating the lock state as follows: The main electronic dial 202, i.e., the operation member for changing the shutter speed, is operated in the state where the multi-electronic lock switch 213 is maintained in the "lock" position and the lock state temporary cancel member 214 is not operated (i.e., the lock is not cancelled). As a result, the photographer, looking through the finder 16, can be notified that the setting of the shutter speed is currently locked.

Figure 5A:
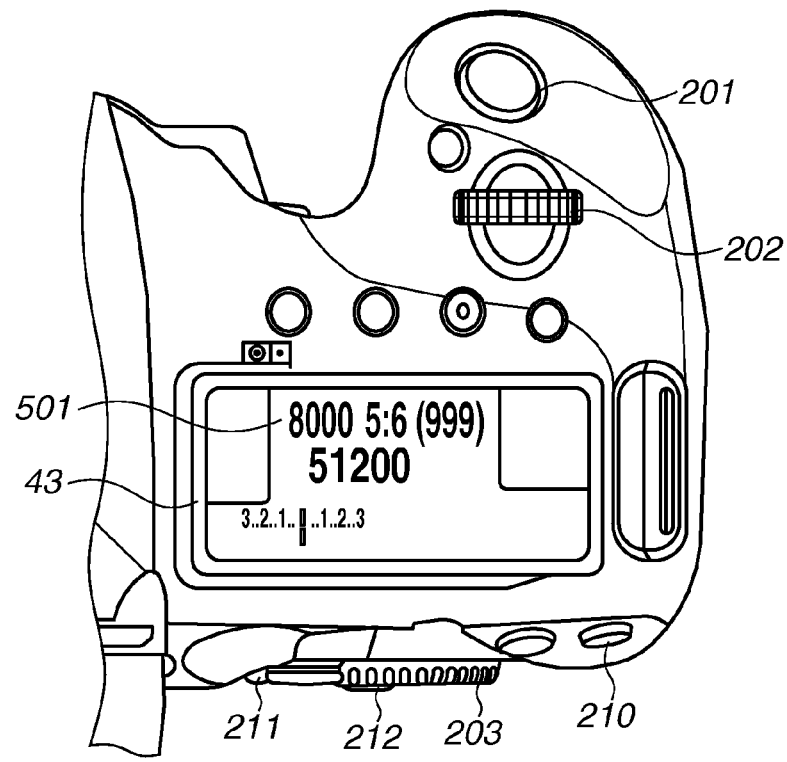
FIGS. 5A and 5B each illustrate a display example of an extra-finder liquid crystal display.
Figure 5B:
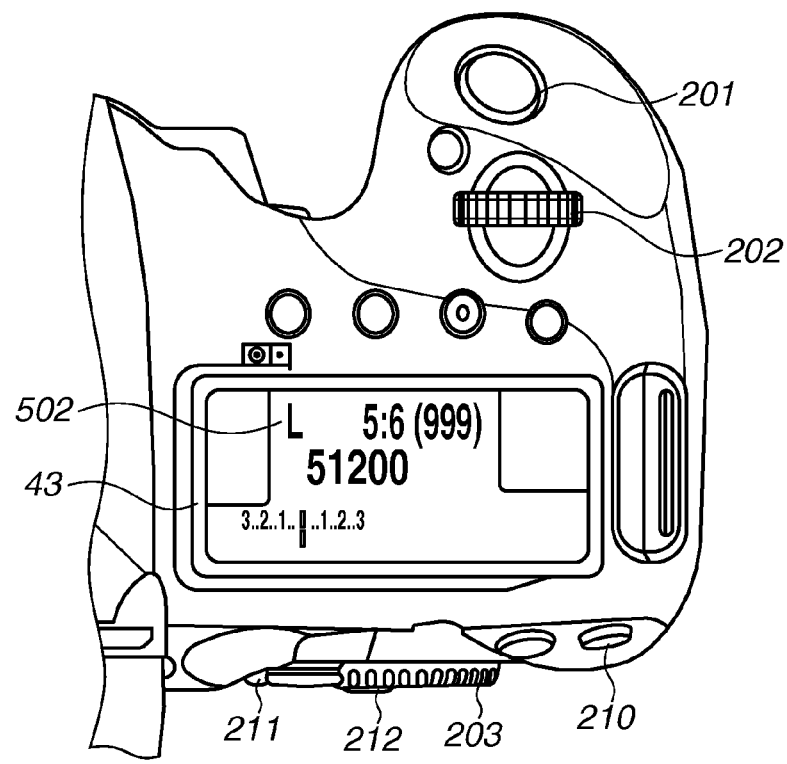

FIG. 5A illustrates an example of a regular display on the extra-finder liquid crystal 43. FIG. 5B illustrates an example of the display on the extra-finder liquid crystal 43 when the operation lock information is displayed. Referring to FIG. 5A, setting values 501 indicate the currently set shutter speed. When the operation lock information is displayed, the displaying of the setting value 501 is replaced by "L" 502 which is the initial letter of "Lock" as illustrated in FIG. 5B. Thus, the display of the shutter speed is switched to the display indicating the lock state according as follows: The main electronic dial 202, i.e., the operation member for changing the shutter speed, is operated in the state where the multi-electronic lock switch 213 is maintained in the "lock" position and the lock state temporary cancel member 214 is not operated (i.e., the lock is not cancelled). As a result, the photographer, looking at the extra-finder liquid crystal 43 can be notified that the setting of the shutter speed is currently locked.

The display methods illustrated in FIGS. 4B and 5B thus allow the photographer to visually recognize that the camera is in the lock state even when the photographer is looking through the finder or looking at the liquid crystal outside the finder.

In step S305 of the flowchart illustrated in FIG. 3, the microcomputer 40 starts a timer for ending the lock state display performed in step S304.

In step S306, the microcomputer 40 determines whether the timer started in step S305 has finished counting. If the timer has finished, (YES in step S306), the process proceeds to step S307. If not (NO in step S306), the process returns to step S306.

In step S307, the microcomputer 40 updates the information displayed on the intra-finder display unit 41 via the intra-finder liquid crystal drive circuit 42 and updates the information displayed on the extra-finder liquid crystal 43 via the extra-finder liquid crystal drive circuit 44 for clearing the lock state information displayed in step S304. FIG. 4A illustrates the display example of the intra-finder display unit 41 after the display of the operation lock information has been ended. Further, FIG. 5A illustrates the display example of the extra-finder liquid crystal 43 after the display of the operation lock information has been ended.

As described above, the setting value can be changed by operating the lock state temporary cancel member 214 when the multi-electronic lock switch 213 is maintained in the "lock" position and the camera is in the lock state.

Further, a function of temporary releasing the lock state may be activated by pressing the determination button 212 on the back surface.

When the setting screen is not displayed on the liquid crystal display unit 25, the determination button 212 can be used as a lock state temporary release button. In such a case, the imaging apparatus has two lock state temporary cancel members, i.e., the lock state temporary cancel member 214 and the determination button 212 having the function of temporary releasing the lock state. Consequently, the imaging apparatus can respond to various uses. For example, if the user makes a setting by operating the main electronic dial 202 arranged on the grip unit 260 side with respect to the mount center portion 250*a* on the upper surface, the user can temporarily cancel the lock state by pressing the determination button 212. Moreover, if the user makes the setting by operating the electronic sub-dial 203 or the multi-controller 211 arranged on the grip unit 260 side with respect to the mount center portion 250*a* on the back surface, the user can temporarily cancel the lock state by operating the lock state temporary cancel member 214.

The entire imaging apparatus may be controlled by a single hardware device or by a plurality of hardware devices sharing the processes.

The present invention which has been described based on the exemplary embodiments is not limited thereto and includes various embodiments within the gist of the invention. Further, each of the above-described exemplary embodiments is only an exemplary embodiment of the present invention and may be combined as appropriate.

The present invention is applicable to any imaging apparatus, and electronic devices such as an electronic still camera, a mobile phone terminal with a camera, and a portable image viewer.

According to the exemplary embodiment of the present invention, the operation system capable of speedily switching the imaging apparatus between the lock state and the unlock state with little erroneous operation can be realized.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-148789, filed Jul. 22, 2014, which is hereby incorporated by reference herein in its entirety.

What is claimed is:

1. An imaging apparatus having a lens or a mount unit for mounting a lens on an object side surface of an apparatus main body and a grip unit at an end portion on one side of the apparatus main body, the imaging apparatus comprising:
   at least one processor coupled to a memory;
   a setting unit configured to set a prohibit state that prohibits changing a setting value of a specific setting item;
   an operation member to be used in changing the setting value of the specific setting item;
   a temporary cancel member; and
   a control unit configured to perform control,
   wherein, in a case where the prohibit state is set and if the temporary cancel member has not been operated and the operation member has been operated, the control unit is configured to perform control not to change the setting value of the specific setting item,
   wherein, in a case where the prohibit state is set and if the temporary cancel member has been operated and the operation member has been operated, the control unit is configured to perform control to change the setting value of the specific setting item according to an operation performed on the operation member,
   wherein, in a case where the prohibit state is not set, the control unit performs control to change the setting value of the specific setting item according to an operation performed on the operation member regardless of whether the temporary cancel member has been operated, and
   wherein the setting unit and the control unit are implemented by the at least one processor.

2. The imaging apparatus according to claim 1, wherein the temporary cancel member is arranged at a position where a finger of a human hand holding the grip unit can operate the temporary cancel member.

3. The imaging apparatus according to claim 2, wherein the temporary cancel member is arranged at a position where the index finger or the ring finger among the fingers of the human hand holding the grip unit can operate the temporary cancel member.

4. The imaging apparatus according to claim 1, wherein the temporary cancel member is arranged closer to the grip unit than a center portion of the lens or the mount unit and arranged on the object side surface.

5. The imaging apparatus according to claim 4, wherein the temporary cancel member is arranged in a periphery of the lens or the mount unit.

6. The imaging apparatus according to claim 5, wherein the temporary cancel member is arranged at a lower portion than the center portion.

7. The imaging apparatus according to claim 1, wherein the temporary cancel member is a push type or a lever type operation member which returns to an original position in a case where the temporary cancel member is not operated.

8. The imaging apparatus according to claim 4, wherein the operation member is arranged closer to the grip unit than the center portion and arranged on a surface which is not the object side surface.

9. The imaging apparatus according to claim 8, wherein the operation member is arranged on an upper surface of the imaging apparatus.

10. The imaging apparatus according to claim 8, wherein the operation member is arranged on an opposite surface of the object side surface.

11. The imaging apparatus according to claim 4, further comprising another temporary cancel member, wherein, in a case where the prohibit state is set and if the another temporary cancel member has not been operated and the operation member has been operated, the control unit performs control not to change the setting value of the specific setting item, wherein, in a case where the prohibit state is not set and if the another temporary cancel member has been operated and the operation member has been operated, the control unit performs control to change the setting value of the specific setting item according to an operation performed on the operation member, and wherein the another temporary cancel member is arranged closer to the grip unit than the center portion and on an opposite surface of the object side surface.

12. A control method for an imaging apparatus having a lens or a mount unit for mounting a lens on an object side surface of an apparatus main body and a grip unit at an end portion on one side of the apparatus main body, a setting unit configured to set a prohibit state that prohibits changing a setting value of a specific setting item, an operation member to be used in changing the setting value of the specific setting item, and a temporary cancel member, the control method comprising:

performing control via at least one processor coupled to a memory, wherein, in a case where the prohibit state is set and if the temporary cancel member has not been operated and the operation member has been operated, performing control includes performing control not to change the setting value of the specific setting item, wherein, in a case where the prohibit state is set and if the temporary cancel member has been operated and the operation member has been operated, performing control includes performing control to change the setting value of the specific setting item according to an operation performed on the operation member, and wherein, in a case where the prohibit state is not set, performing control includes performing control to change the setting value of the specific setting item according to an operation performed on the operation member regardless of whether the temporary cancel member has been operated.

13. A non-transitory computer-readable storage medium storing a program for causing a computer to perform a control method to control an imaging apparatus having a lens or a mount unit for mounting a lens on an object side surface of an apparatus main body and a grip unit at an end portion on one side of the apparatus main body, a setting unit configured to set a prohibit state that prohibits changing a setting value of a specific setting item, an operation member to be used in changing the setting value of the specific setting item, and a temporary cancel member, the control method comprising:

performing control via at least one processor coupled to a memory, wherein, in a case where the prohibit state is set and if the temporary cancel member has not been operated and the operation member has been operated, performing control includes performing control not to change the setting value of the specific setting item, wherein, in a case where the prohibit state is set and if the temporary cancel member has been operated and the operation member has been operated, performing control includes performing control to change the setting value of the specific setting item according to an operation performed on the operation member, and wherein, in a case where the prohibit state is not set, performing control includes performing control to change the setting value of the specific setting item according to an operation performed on the operation member regardless of whether the temporary cancel member has been operated.

14. An imaging apparatus having a lens or a mount unit for mounting a lens on an object side surface of an apparatus main body and a grip unit at an end portion on one side of the apparatus main body, the imaging apparatus comprising:

at least one processor coupled to a memory;

a setting unit configured to set a prohibit state that prohibits changing a setting value of a specific setting item;

an operation member to be used in changing the setting value of the specific setting item;

a temporary cancel member; and a control unit configured to perform control, wherein, in a case where the prohibit state is set and if the temporary cancel member has not been operated and the operation member has been operated, the control unit is configured to perform control not to change the setting value of the specific setting item, wherein, in a case where the prohibit state is set and if the temporary cancel member has been operated and the operation member has been operated, the control unit is configured to perform control to change the setting value of the specific setting item according to an operation performed on the operation member, wherein the temporary cancel member is arranged closer to the grip unit than a center portion of the lens or the mount unit and arranged on the object side surface, and wherein the setting unit and the control unit are implemented by the at least one processor.

15. The imaging apparatus according to claim 14, wherein the temporary cancel member is arranged at a position where a finger of a human hand holding the grip unit can operate the temporary cancel member.

16. The imaging apparatus according to claim 15, wherein the temporary cancel member is arranged at a position where the index finger or the ring finger among the fingers of the human hand holding the grip unit can operate the temporary cancel member.

17. The imaging apparatus according to claim 14, wherein the temporary cancel member is arranged in a periphery of the lens or the mount unit.

18. The imaging apparatus according to claim 17, wherein the temporary cancel member is arranged at a lower portion than the center portion.

19. The imaging apparatus according to claim 14, wherein the temporary cancel member is a push type or a lever type operation member which returns to an original position in a case where the temporary cancel member is not operated.

20. The imaging apparatus according to claim 14, wherein the operation member is arranged closer to the grip unit than the center portion and arranged on a surface which is not the object side surface.

21. The imaging apparatus according to claim 20, wherein the operation member is arranged on an upper surface of the imaging apparatus.

22. The imaging apparatus according to claim 20, wherein the operation member is arranged on an opposite surface of the object side surface.

23. The imaging apparatus according to claim 14, further comprising another temporary cancel member, wherein, in a case where the prohibit state is set and if the another temporary cancel member has not been operated and the operation member has been operated, the control unit performs control not to change the setting value of the specific setting item, wherein, in a case where the prohibit state is not set and if the another temporary cancel member has been operated and the operation member has been operated, the control unit performs control to change the setting value of the specific setting item according to an operation performed on the operation member, and wherein the another temporary cancel member is arranged closer to the grip unit than the center portion and on an opposite surface of the object side surface.

24. A control method for an imaging apparatus having a lens or a mount unit for mounting a lens on an object side surface of an apparatus main body and a grip unit at an end portion on one side of the apparatus main body, a setting unit configured to set a prohibit state that prohibits changing a setting value of a specific setting item, an operation member to be used in changing the setting value of the specific setting item, and a temporary cancel member, the control method comprising:

performing control via at least one processor coupled to a memory, wherein, in a case where the prohibit state is set and if the temporary cancel member has not been operated and the operation member has been operated, performing control includes performing control not to change the setting value of the specific setting item, wherein, in a case where the prohibit state is set and if the temporary cancel member has been operated and the operation member has been operated, performing control includes performing control to change the setting value of the specific setting item according to an operation performed on the operation member, and wherein the temporary cancel member is arranged closer to the grip unit than a center portion of the lens or the mount unit and arranged on the object side surface.

25. A non-transitory computer-readable storage medium storing a program for causing a computer to perform a control method to control an imaging apparatus having a lens or a mount unit for mounting a lens on an object side surface of an apparatus main body and a grip unit at an end portion on one side of the apparatus main body, a setting unit configured to set a prohibit state that prohibits changing a setting value of a specific setting item, an operation member to be used in changing the setting value of the specific setting item, and a temporary cancel member, the control method comprising:

performing control via at least one processor coupled to a memory, wherein, in a case where the prohibit state is set and if the temporary cancel member has not been operated and the operation member has been operated, performing control includes performing control not to change the setting value of the specific setting item, wherein, in a case where the prohibit state is set and if the temporary cancel member has been operated and the operation member has been operated, performing control includes performing control to change the setting value of the specific setting item according to an operation performed on the operation member, and wherein the temporary cancel member is arranged closer to the grip unit than a center portion of the lens or the mount unit and arranged on the object side surface.

* * * * *